United States Patent [19]

Humme et al.

[11] 4,221,879
[45] Sep. 9, 1980

[54] IMPACT-RESISTANT POLYAMIDE MOULDING COMPOSITIONS

[75] Inventors: Gert Humme, Odenthal; Friedrich Fahnler; Dieter Neuray, both of Krefeld; Karl-Heinz Ott, Leverkusen; Peter Tacke, Krefeld, all of Fed. Rep. of Germany

[73] Assignee: Bayer Aktiengesellschaft, Fed. Rep. of Germany

[21] Appl. No.: 943,379

[22] Filed: Sep. 18, 1978

[30] Foreign Application Priority Data

Sep. 20, 1977 [DE] Fed. Rep. of Germany ....... 2742176
Dec. 28, 1977 [DE] Fed. Rep. of Germany ....... 2758615

[51] Int. Cl.² .............................................. C08L 77/00
[52] U.S. Cl. ................................................... 525/66
[58] Field of Search ....................... 260/857 D, 857 G; 525/66

[56] References Cited

U.S. PATENT DOCUMENTS

| | | | |
|---|---|---|---|
| 2,802,808 | 8/1957 | Hayes | 260/880 R |
| 3,134,746 | 5/1964 | Grabowski | 260/857 G |
| 3,267,175 | 8/1966 | Grabowski | 260/857 G |
| 4,079,024 | 5/1978 | Hess | 260/857 D |

Primary Examiner—Paul Lieberman
Attorney, Agent, or Firm—Connolly and Hutz

[57] ABSTRACT

Thermoplastic moulding compositions with improved notched impact strength consisting of a polyamide and a graft product of polybutadiene or copolymers of butadiene as graft substrate and of a mixture of an ester of (meth)acrylic acid, (meth)acrylonitrile and/or (meth)acrylamide as graft monomers.

8 Claims, No Drawings

IMPACT-RESISTANT POLYAMIDE MOULDING COMPOSITIONS

This invention relates to thermoplastic polyamide moulding compositions which have improved notched impact strength and resistance to oxidative degradation.

Moulded polyamide products have relatively little impact strength in the dry state. Their strength can be improved by conditioning which means by the absorption of water. Since the uniform distribution of water required for this purpose is a time-consuming procedure, there has been a search for suitable substances by which the necessary toughness can be imparted to the polyamide without conditioning in water.

An improvement in the toughness of polyamide products can be obtained, for example, by means of the low molecular weight plasticisers mentioned in Kunststoff-Handbuch, Volume VI, page 242, Polyamide, Carl-Hanser-Verlag, 1966. However, these plasticisers have various disadvantages, for example their tendency to migration, their volatility, their comparative ineffectiveness at low temperatures and their excessive softening effect combined with only a modest improvement in the toughness.

The incorporation of copolymers of ethylene, acrylic acid and/or derivatives of acrylic acid in polyamides to improve their impact strength has been disclosed in German Pat. Nos. 1,241,606=Great Britain Pat. No. 998439 and 1,669,702(=U.S. Pat. No. 3,700,751). But the mixtures obtained have insufficient stability against oxidative degradation.

The same applies to polyamide moulding compositions in which the impact strength has been improved according to German Offenlegungsschrift No. 2,622,973 by the addition of various copolymers or graft polymers of vinyl compounds on homopolymers and copolymers.

Although mixtures of aliphatic polyamides and polybutadiene and isoprene rubber have increased resistance to oxidative degradation, their manufacturing process is uneconomical owing to the long time required for stirring the rubber into the polyamide melt. If, therefore, moulding compositions of polybutadiene rubber and polyamides are produced in commercial extruders, the components show signs of severe incompatibility. This is shown by the inhomogeneous surfaces and especially by the scaling off which occurs when moulded parts produced from these mixtures are subjected to bending stresses.

Attempts to improve the compatability by using graft copolymers which have rubbery elastic properties have been disclosed in German Offenlegungsschrift No. 2,435,266=Great Britain Pat. No. 1506430. According to the teaching given in this Offenlegungsschrift, any conventional graft copolymers are suitable for this purpose provided they do not contain dienes with conjugated double bonds, such as butadiene, as graft bases. Graft polymers of this type are taught to be unsuitable for mixing with polyamides because the resulting moulding compositions have insufficient stability against the action of light, heat and oxygen.

It has now surprisingly been found that polymer mixtures of polyamides and graft copolymers of of (meth)acrylic acid derivatives and crosslinked polybutadienes not only have excellent homogeneity without any tendency to separation into their components and very high impact strength and notched impact strength, especially at low temperatures, but also a surprising stability against oxidative degradation.

This invention therefore relates to polyamide moulding compositions consisting of (I) 40 to 99.5% by weight, preferably 60 to 95% by weight, of polyamides having a relative viscosity (determined on a 1% solution in m-cresol at 25° C.) of from 2.3 to 5; and (II) 0.5 to 60% by weight, preferably 5 to 40% by weight, of a graft product prepared from
  (a) 34 to 95% by weight, preferably 50 to 90% by weight, of a cross-linked polymer of butadiene and/or substituted butadiene and optionally a total of up to 40% by weight of styrene and/or acrylonitrile and/or an ester of acrylic acid as graft substrate and
  (b) 5 to 66% by weight, preferably 10 to 50% by weight of monomers which are to be grafted, consisting of
  ($\alpha$) 3 to 100% by weight, preferably 10 to 100% by weight, of an ester of (meth)acrylic acid,
  ($\beta$) 0 to 80% by weight, preferably 0 to 60% by weight, of (meth)acrylamide, and
  ($\gamma$) 0 to 80% by weight, preferably 0 to 60% by weight, of (meth)acrylonitrile, wherein the sum of (I) and (II) of (a) and (b) and of ($\alpha$)–($\gamma$) must in each case be 100% by weight.

The following polyamides may be used for the moulding compositions according to the invention: Polyamide-6, Polyamide-6,6, mixtures and block copolymers of these two components and copolymers of $\epsilon$-caprolactam, adipic acid and hexamethylene diamine. It is also possible to use polyamides in which the acid component consists partly or completely of terephthalic acid and/or isophthalic acid and/or suberic acid and/or sebacic acid and/or azeleic acid and/or cyclohexane dicarboxylic acid and the diamine component consists partly or completely of m-and/or p-xylylene diamine and/or 2,2,4-trimethyl-hexamethylene diamine and/or 2,4,4-trimethyl-hexamethylene diamine and/or isophorone diamine.

Polyamides prepared partly or completely from lactams having 7–12 C-atoms, optionally with the addition of one or more of the above mentioned starting components, may also be used. Polyamide-6 and polyamide-6,6 are preferred.

Cross-linked rubbers are used as graft bases for preparation of the graft products. Diene rubbers based on polybutadiene and/or polyisoprene which may contain a total of up to 40% by weight of styrene and/or acrylonitrile and/or esters of acrylic acid as comonomers are preferably used.

Graft monomers used for the purpose of this invention include acrylonitrile, methacrylonitrile and aliphatic esters and amides of acrylic acid and methacrylic acid preferably having up to 22 C-atoms. The preferred graft monomers are esters of acrylic acid and acrylonitrile. Among the esters of acrylic acid, the ethyl, n-butyl, tertiary butyl, octyl and ethylhexyl esters are particularly preferred.

The graft products used according to the invention may be prepared by any known polymerisation processes (emulsion, solution, solvent-free, suspension or precipitation polymerisation) or by combinations of these processes.

To prepare the graft products, the monomers which are to be grafted on the graft substrate are polymerised in the presence of the preformed rubber graft substrate.

A free polymer of the graft monomers is formed in addition to the graft polymer itself. The term "graft products" means the sum of the graft polymers themselves and the ungrafted free polymers. The quantity of grafted monomers, their molecular weight and the composition of the grafted monomers may be varied within wide limits by varying the polymerisation conditions, especially the nature of the polymerisation process, the temperature, the activator system, the molecular weight regulators, the conditions of stirring and the method of measuring out the monomers.

Emulsion polymerisation is the preferred polymerisation process for the production of the graft polymers used according to this invention.

For preparation of the graft products by emulsion polymerisation, cross-linked diene rubbers, preferably obtained by emulsion polymerisation, are preferably used as the graft substrate. Rubbers which have an "average particle diameter" $d_{50}$ greater than 0.1 μm, preferably greater than 0.2 μm, are particularly preferred (for determination of the average particle diameter, see W. Scholtan and H. Lange, Kolloid-Z. and Z. Polymere 250 (1972) 782–796).

Each of the above mentioned graft monomers may be used separately for the grafting reaction or they may be used as mixtures.

Instead of only one graft substrate, mixtures of various graft substrates may be used for preparing the graft products. Moreover, the polyamides may be mixed with mixtures of several graft products according to the invention differing in their structure, instead of with only one graft product.

The moulding compositions according to the invention may have incorporated therein up to 30% by weight of fillers and/or reinforcing substances, up to 3% by weight of processing auxiliaries up to 1% by weight of stabilizers, up to 3% by weight of antistatic agents up to 5% by weight of colour pigments and dyes and up to 20% by weight of fire-retarding agents. All % by weight are based on the total composition.

The following are mentioned as examples of such additives: glass fibres and pellets, asbestos, chalk, talcum, kaolin, sterically hindered phenols, copper salts, $TiO_2$, ZnS, phthalocyanines, powdered red phosphorus, phosphorus compounds, halogen and nitrogen compounds, oxides of antimony, iron and zinc, and aluminium hydroxide.

Incorporation of the graft products in the polyamides may be carried out in ordinary commercial extruders. Double shaft extruders are preferably used.

The mould compositions according to the invention are particularly suitable for the production of injection-moulded parts which have a high impact resistance even at low temperatures and which have excellent resistance to oxidative degradation at elevated temperatures without any special stabilising treatment.

EXAMPLES

Preparation of the graft substrates (Experiments 1–3)

A solution of the following components (see Table 1):
w: parts by weight of salt-free water,
l: parts by weight of the sodium salt of disproportionated abietic acid, and
p: parts by weight of potassium peroxy disulphate, is introduced into a pressure-resistant stirrer vessel.

After displacement of the air with nitrogen and adjustment of the reaction temperature to 55° C., the following components are added:
r: parts by weight of dodecyl mercaptan, followed by
b: parts by weight of butadiene,
s: parts by weight of styrene,
f: parts by weight of n-butyl acrylate,
and the mixture is polymerised.

As the reaction velocity falls with progressive polymerisation, the temperature is slowly raised to 68° C.

After completed polymerisation, small quantities of unreacted butadiene are removed by stirring the resulting latex under reduced pressure.

Preparation of the graft products (Experiments 4–14)

The latices used as graft substrates described in Experiments 1–3 are diluted with salt-free water to a polymerisation concentration so as to provide
g: parts by weight of graft substrate (solid product) (see Table 2), and
175 g: parts by weight of water.

The water used for diluting the latex contains 0.3 parts by weight (based on the graft substrate plus graft monomers) of potassium peroxy disulphate.

After displacement of the air by nitrogen and heating to 65° C., 2 parts by weight of emulsifier (sodium salt of disproportionated abietic acid or alkyl sulphate) dissolved in 25 parts by weight of salt-free water and the sum of monomers (acrylonitrile, acrylic acid esters) shown in Table 2 are added from two separate inflows, the quantities given being based on g parts of graft substrate (solid polymer), as shown in Table 2.

The time taken for inflow of these components is approximately 4 hours. After the inflow of these components has been completed, the reaction mixture is stirred for further 2 hours at 65° C. to complete the reaction.

After the addition of 1 part by weight (to 100 parts of solid polymer) of a phenolic antioxidant (2,6-ditertiarybutyl-p-cresol) to the resulting graft product latex, the latex is coagulated with a 2% $MgSO_4$-solution and the coagulate is separated, washed until free from salt and dried in a vacuum at 70° C.

Incorporation of the graft products into the polyamide (Experiments 15–30 and comparison experiments (A–C)

Incorporation of the graft products described in Experiments 4–14 into the polyamides was carried out in a commercial double shaft extruder ZSK 53 manufactured by Werner & Pfleiderer. The screws had a length of 25 D. The operating conditions and experimental results of mixtures containing a constant ratio of polyamide/graft product of 80:20 (parts by weight) are summarised in Table 3.

TABLE 1

Composition of graft substrates

| Experiment No. | w | l | p | r | b | s | f | Solids content (%) | $d_{50}$ |
|---|---|---|---|---|---|---|---|---|---|
| 1 | 80 | 1.5+ | 0.3 | 0.35 | 100 | — | — | 56.1 | 0.38 |
| 2 | 80 | 1.5+ | 0.3 | 0.35 | 90 | 10 | — | 56.8 | 0.35 |
| 3 | 80 | 1.5+ | 0.3 | 0.35 | 95 | — | 5 | 56.5 | 0.31 |

+0.5 parts by weight of the emulsifier are provided at the beginning of polymerisation and a further 1 part by weight is added in the course of polymerisation.

TABLE 2

Composition of the Graft Product

| Experiment No. | Graft substrate (latex) from Exp. No. | Parts by weight of graft substrate (solid polymer) | Parts by weight of n-butyl acrylate | Parts by weight of acrylonitrile | Parts by weight of other monomers | Parts by weight of emulsifier |
|---|---|---|---|---|---|---|
| 4 | 1 | 80 | 13 | 7 | — | 2 |
| 5 | 1 | 50 | 32 | 18 | — | 2 |
| 6 | 1 | 80 | 8 | 12 | — | 2 |
| 7 | 1 | 80 | 20 | — | — | 2 |
| 8 | 1 | 80 | — | — | 20 tert.butyl acrylate | 2 |
| 9 | 1 | 80 | — | 13 | 7 n-octyl acrylate | 2 |
| 10 | 1 | 80 | — | 5 | 15 styrene | 2 |
| 11 | 2 | 50 | 32 | 18 | — | 2 |
| 12 | 2 | 80 | 13 | 7 | — | 2 |
| 13 | 2 | 80 | 18 | — | 2 acrylamide | 2 |
| 14 | 3 | 80 | 13 | 7 | — | 2 |

TABLE 3

Compositions and Properties of the Mixtures/Weight ratio of polyamide to graft product = 80:20

| Experiment No. | Graft products of Exp. No. | Polyamide/ $\eta$ rel | Temperature of mass °C. | Notched impact strength at 23° C. in kJ/m$^2$ | Homogeneity (white fracture on bending)+ | Colour |
|---|---|---|---|---|---|---|
| 15 | 4 | PA-6 3.91 | 266 | 53.8 | very good | yellow |
| 16 | 5 | " | 267 | 52.2 | very good | yellow |
| 17 | 6 | " | 262 | 54.1 | very good | pale yellow |
| 18 | 7 | " | 265 | 29.8 | very good | colourless |
| 19 | 8 | " | 273 | 55.3 | very good | colourless |
| 20 | 9 | " | 262 | 33.7 | very good | yellow |
| 21 | 11 | " | 269 | 55.7 | very good | yellow |
| 22 | 12 | " | 263 | 55.1 | very good | yellow |
| 23 | 13 | " | 269 | 32.5 | very good | colourless |
| 24 | 14 | " | 265 | 53.9 | very good | yellow |
| 25 | 4 | PA-6 2.94 | 243 | 41.5 | very good | yellow |
| 26 | 4 | PA6.6/4.05 | 288 | 51.7 | very good | yellow |
| 27 | 4 | PA6.6/3.17 | 281 | 43.2 | very good | yellow |
| 28 | 4 | Copolymer of 85 parts by weight of caprolactam, 15 parts by weight of lauryl lactam/2.89 | 245 | 45.4 | very good | yellow |
| 29 | 4 | 50 parts by weight of PA-6/3.91 50 parts by weight of PA-6,6/4.05 | 285 | 55.4 | very good | yellow |
| 30 | 4 | PA of isophthalic acid/hexamethylene diamine/2.68 | 243 | 51.9 | very good | yellow |
| A | Lupolen A 2910MX+ | PA-6/3.91 | 268 | 55,3 | very good | colourless |
| B | Polybutadiene graft substrate of experiment 1 | PA-6/3.91 | 262 | 33.8 | very poor | light brown |
| C | Graft prod. of exp. 10 | PA-6/3.91 | 268 | 11.3 | moderate | nearly colourless |

+The white fracture was assessed after bending a standard test rod ten times at the middle through 360° C.

+Copolymer of ethylene with 7% by weight butylacrylate and 4% by weight acrylic acid, see "Kunststoffe" Vol. 62 (1972), Page 72

The relative solution viscosity of the polyamide component ($\eta$ rel) was determined in each case on a 1% solution in m-cresol at 25° C., using an Ubbelohde-Viskosimeter.

The temperature of the mass was measured with a temperature probe at the exit of the mass from the extruder nozzle.

The notched impact strength was determined according to DIN 53 453 on a freshly moulded standard test rod.

Table 4 shows the results of Experiments in which the ratio of polyamide to graft polymer was 65:35.

In Table 5, the notched impact strength of mixtures determined at low temperatures according to DIN 53 453 are compared.

Table 6 shows the stability of the mixtures against oxidative degradation at elevated temperatures. Standard test rods of the various products were stored in a circulating air-drying cupboard at 100° C. and 150° C., and some of the rods were removed after the given length of time and their impact strength was determined after they had cooled to 23° C.

TABLE 4

Composition and Properties of the Mixtures
(weight ratio of polyamide to graft product = 65:35)

| Experiment No. | Graft product of Exp. No. | Polyamide/$\eta_{rel}$ | Mass temperature °C. | Notched impact strength at 23° C. in kJ/m² | Homogeneity (White fracture on bending) | Colour |
|---|---|---|---|---|---|---|
| 31 | 4 | PA-6/3.91 | 276 | 58.9 | very good | yellow |
| 32 | 7 | " | 273 | 60.3 | very good | colourless |
| 33 | 8 | " | 273 | 69.3 | very good | colourless |

TABLE 5

Comparison of the notched impact strengths at various temperatures.

| Mixture from Experiment No. | Notched impact strength in kJ/m² at | | | |
|---|---|---|---|---|
| | 23° C. | 0° C. | −20° C. | −40° C. |
| PA-6, ($\eta$, rel = 3.91) (Comparison) | 5.5 | 4.5 | 4 | 4 |
| 18 | 29.8 | 22.3 | 18.2 | 11.2 |
| 19 | 55.3 | 32.5 | 23.2 | 21.3 |
| 22 | 55.1 | 34.6 | 23.5 | 17.8 |
| 31 | 58.9 | 45.6 | 32.8 | 26.4 |

TABLE 6

Comparison of the stability against oxidative degradation

Notched impact strength in kJ/m²

| | Mixture from Experiment No. | 100° C. | | | | | | | | 150° C. | | | | | | | |
|---|---|---|---|---|---|---|---|---|---|---|---|---|---|---|---|---|---|
| | | 24 hrs. | 3 d | 7 d | 9 d | 14 d | 21 d | 36 d | 78 d | 24 hrs. | 3 d | 7 d | 9 d | 14 d | 21 d | 36 d | 78 d |
| comparison tests | PA-6, $\eta$ rel = 3.91 | 26.6 | 25.2 | 6.4 | 4 | — | — | — | — | 9.6 | 8 | 5.2 | 4 | — | — | — | — |
| | PA-6, $\eta$ rel = 3.91 containing 0.5% by weight of 2,6-ditertiary-butyl-p-cresol | n.br. | 58.8 | 36.2 | 19.5 | 5.5 | — | — | — | 47.9 | 23.6 | 8.6 | 6.1 | 3.2 | — | — | — |
| | A++ | n.br. | 66 | 14.8 | 8 | — | — | — | — | 15.5 | 10.4 | 6.8 | 5.6 | — | — | — | — |
| | 18 | " | n.br. | n.br. | 72.3 | 68.3 | 56 | 50.9 | 32.6 | n.br. | 76.2 | 74.5 | 68.8 | 53.6 | 48 | 51.6 | 22.2 |
| | 19 | " | " | " | 73.8 | 66.2 | 58.6 | 52.9 | 30.8 | " | 78 | 73.9 | 69.7 | 57.2 | 54 | 51.5 | 23.7 |
| | 22 | " | " | " | 71.9 | 62.6 | 59.7 | 49.1 | 26.3 | " | 74.1 | 72.3 | 63.5 | 54 | 51.7 | 49.4 | 18.2 |
| | 31 | " | " | " | 71.9 | 85.9 | 69.1 | 58.1 | 35.6 | " | 105 | 96.2 | 81.8 | 75.3 | 68 | 61.5 | 25 | d = days
n.br. = not broken
++ according to table 3

We claim:

1. A polyamide mounding composition, comprising a polymer mixture consisting substantially of
   (I) 40 to 99.5% by weight of at least one polyamide having a relative viscosity (determined on a 1% solution in m-cresol at 25° C.) of from 2.3 to 5; and
   (II) 0.5 to 60% by weight of a graft product prepared from
   (a) 34 to 95% by weight of a cross-linked polymer selected from the group consisting of butadiene, substituted butadiene and mixtures thereof, with up to 40% by weight of a comonomer selected from the group consisting of styrene, acrylonitrile, an ester of acrylic acid and mixtures thereof as a graft substrate and
   (b) 5 to 66% by weight of graft monomers consisting of
   ($\alpha$) 3 to 100% by weight of an ester of (meth)acrylic acid,
   ($\beta$) 0 to 80% by weight of (meth)acrylamide, and
   ($\gamma$) 0 to 80% by weight of (meth)acrylonitrile,
   the sum of (I) and (II), of (a) and (b) and of ($\alpha$)−($\gamma$) in each case being substantially 100% by weight.

2. A moulding composition as claimed in claim 1, wherein the polymer mixture consists substantially of 60 to 95% by weight of component (I) and 5 to 40% by weight of component (II).

3. A moulding composition as claimed in claim 1, wherein component (II) is prepared from 50 to 90% by weight of component (a) and 10 to 50% by weight of component (b).

4. A moulding composition as claimed in claim 1, wherein component (b) consists substantially of 10 to 100% by weight of component ($\alpha$) and 0 to 60% by weight of each of components ($\beta$) and ($\gamma$).

5. A moulding composition as claimed in claim 1 wherein the graft monomers are esters of acrylic acid and acrylonitrile.

6. A moulding composition as claimed in claim 5, wherein the ester of acrylic acid is the ethyl-, n-butyl-, tert.-butyl-octyl- or ethylhexyl acrylate.

7. A moulding composition as claimed in claim 1, wherein the polyamide is polyamide-6 or polyamide-6,6.

8. Impact-resistant moulded products produced from a moulding composition as claimed in claim 1.

* * * * *